(12) United States Patent
Brant et al.

(10) Patent No.: US 6,983,396 B2
(45) Date of Patent: Jan. 3, 2006

(54) APPARATUS FOR REDUCING THE OVERHEAD OF CACHE COHERENCY PROCESSING ON EACH PRIMARY CONTROLLER AND INCREASING THE OVERALL THROUGHPUT OF THE SYSTEM

(75) Inventors: William A. Brant, Boulder, CO (US); Mohamad H. El-Batal, Westminster, CO (US); Thomas E. Richardson, Golden, CO (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 10/077,249

(22) Filed: Feb. 15, 2002

(65) Prior Publication Data

US 2003/0159082 A1 Aug. 21, 2003

(51) Int. Cl.
*G06F 11/00* (2006.01)
(52) U.S. Cl. .......................... 714/6; 710/314
(58) Field of Classification Search ................ 714/6, 714/7, 9; 710/314
See application file for complete search history.

(56) References Cited

U.S. PATENT DOCUMENTS

| | | | |
|---|---|---|---|
| 5,367,701 A | 11/1994 | Von Gnechten et al. | |
| 5,689,678 A | 11/1997 | Stallmo et al. | |
| 5,708,668 A | 1/1998 | Styczinski | |
| 5,708,771 A | 1/1998 | Brant et al. | |
| 5,761,705 A | 6/1998 | DeKoning et al. | |
| 5,809,332 A | 9/1998 | Vishlitzky et al. | |
| 5,887,270 A | 3/1999 | Brant et al. | |
| 5,937,428 A * | 8/1999 | Jantz .......................... | 711/114 |
| 5,958,066 A | 9/1999 | Kedem | |
| 5,959,860 A | 9/1999 | Styczinski | |
| 6,195,720 B1 * | 2/2001 | Abiven et al. .............. | 710/310 |
| 6,408,358 B1 * | 6/2002 | Uchiyama et al. .......... | 711/114 |
| 6,704,812 B2 * | 3/2004 | Bakke et al. ................ | 710/38 |
| 6,754,761 B1 * | 6/2004 | Asaad et al. ................ | 710/311 |
| 2003/0159082 A1 * | 8/2003 | Brant et al. ................... | 714/5 |

\* cited by examiner

*Primary Examiner*—Bryce P. Bonzo
(74) *Attorney, Agent, or Firm*—Chambliss, Bahner & Stophel, P.C.; David W. Lynch

(57) ABSTRACT

A bridged controller for reducing the overhead of cache coherency processing on each of a plurality of primary controllers and increasing the overall throughput of the system. The bridged controller interfaces with dual-active pair of host-side controllers and the backend disk drive buses. The third controller allows a doubling of the number of backend busses, reduces the overhead of cache coherency processing on each primary host-side controller and doubles the overall throughput.

16 Claims, 10 Drawing Sheets

APPARATUS FOR REDUCING THE OVERHEAD OF CACHE COHERENCY PROCESSING ON EACH PRIMARY CONTROLLER AND INCREASING THE OVERALL THROUGHPUT OF THE SYSTEM

BACKGROUND OF THE INVENTION

1. Field of the Invention

This invention relates in general to data storage systems, and more particularly to an apparatus for reducing the overhead of cache coherency processing on each primary controller and increasing the overall throughput of the system.

2. Description of Related Art

Disk drive systems have grown enormously in both size and sophistication in recent years. These systems can typically include many large disk drive units controlled by a complex multi-tasking disk drive controller. A large-scale disk drive system can typically receive commands from a number of host computers and can control a large number of disk drive mass storage units, each mass storage unit capable of storing in excess of several gigabytes of data. There is every reason to expect that both the sophistication and size of the disk drive systems will increase.

As the systems grow in complexity, so also does the user's reliance upon the system, for fast and reliable recovery and storage of data. Thus, it is more than a mere inconvenience to the user should the disk drive system go "down" or off-line; and even should only one disk drive go offline, substantial interruption to the operation of the entire system can occur. For example, a disk drive storage unit may be part of RAID array or may be part of a mirrored system.

As computer systems have become larger, faster, and more reliable, there has been a corresponding increase in need for storage capacity, speed and reliability of the storage devices. Simply adding storage units to increase storage capacity causes a corresponding increase in the probability that any one unit will fail. On the other hand, increasing the size of existing units, absent any other improvements, tends to reduce speed and does nothing to improve reliability.

Recently there has been considerable interest in arrays of direct access storage devices, configured to provide some level of data redundancy. Such arrays are commonly known as "RAIDs" (Redundant Array of Inexpensive Disks). RAID storage systems are commonly used in high-profile industries, such as the banking and airline industries, where the inability to access certain data for even a moment, let alone its loss, can spell disaster. RAID storage systems are often referred to as "fault-tolerant" due to their ability to access data even when one or more storage devices fail. RAID storage systems accomplish this by distributing redundant copies of data across multiple storage devices. RAID technology is independent of the type of storage device used, and thus may be applied to systems which use magnetic, optical, or semiconductor disk drives, or large capacity tape drives, or a mix of different type storage devices.

Several RAID architectures exist for providing redundant access of data. The particular RAID architecture used mandates both the format of the data across the multiple storage devices and the way in which the redundant data is accessed. RAID architectures are categorized in levels ranging from 1–5 according to the architecture of the storage format.

In a level 1 RAID storage system, a duplicate set of data is stored on pairs of "mirrored" storage devices. Accordingly, identical copies of data are stored to each storage device in each pair of mirrored storage devices. The RAID 1 level storage system provides absolute redundancy and therefore high reliability, but it requires twice the storage space. This method is therefore costly and space-consuming.

In a level 2 RAID storage system, each bit of each word or data, plus Error Detection and Correction (EDC) bits for each word, are stored on separate storage devices. Thus, in a 32-bit word architecture having 7 EDC bits, 39 separate storage devices are required to provide the redundancy. In this example, if one of the storage devices fails, the remaining 38 bits of each stored 39-bit word can be used to reconstruct each 32-bit word on a word-by-word basis as each data word is read from the storage devices, thereby obtaining fault tolerance. Although the redundancy is achieved not by duplicating the data but by reconstructing the accessible data, and therefore less actual storage space is required to achieve redundancy, the level 2 RAID storage system has the disadvantage that it requires one storage device for each bit of data and EDC, which can amount to a very large and costly system.

In a level 3 RAID storage system, each storage device itself includes error detection means. This is often achieved using a custom-designed Application Specific Integrated Circuit (ASIC) within the storage device itself that is designed to provide built-in hardware error detection and correction capabilities. Level 3 RAID systems accordingly do not need the more sophisticated multiple EDC bits, which allows a simpler exclusive-or parity checking scheme requiring only one bit to be used to generate parity information. Level 3 RAID storage systems thus only require one storage device to store parity information, which, in combination with each of the data bit storage devices, may be used to recover the accessible bits and reconstruct inaccessible data.

In the level 2 and 3 RAID storage systems, each bit of the data and parity is transferred to and from each respective distributed storage device in unison. In other words, this arrangement effectively provides only a single read/write head actuator for the entire storage device. For large files, this arrangement has a high data transfer bandwidth since each individual storage device actuator transfers part of a block of data, which allows an entire block to be accessed much faster than if a single storage device actuator were accessing the block. However, when the data files to be accessed are small, the random access performance of the drive array is adversely affected since only one data file at a time can be accessed by the "single" actuator.

A level 4 RAID storage system employs the same parity error correction scheme as the level 3 RAID architecture, but essentially decouples the individual storage device actuators to improve on the performance of small file access by reading and writing a larger minimum amount of data, such as a disk sector rather than a single bit, to each disk. This is also known as block striping. In the level 4 RAID architecture, however, writing a data block on any of the independently operating storage devices also requires writing a new parity block on the parity unit. The parity information stored on the parity unit must be read and XOR'd with the old data (to "remove" the information content of the old data), and the resulting sum must then be XOR'd with the new data (to "add" the new parity information). Both the data and the parity records must then be rewritten to the disk drives. This process is commonly referred to as a "Read-Modify-Write" (RMW) operation. Thus, a READ and a WRITE on the single parity storage device occurs each time a record is changed on any of the storage devices covered by a parity record on the parity storage device. The parity storage device becomes a bottleneck to data writing operations since the number of changes to records which can be made per unit of time is a function of the access rate of the parity storage device, as opposed to the faster access rate provided by parallel operation of the multiple storage devices.

A level 5 RAID storage system is similar to the level 4 RAID architecture in its parity error correction scheme and in its decoupling of the individual storage device actuators, but improves upon the performance of WRITE accesses by distributing the data and parity information over all of the available storage devices in a circular fashion. Accordingly, the number of WRITE operations which can be made per unit of time is no longer a function of the access rate of a single parity storage device because the parity information is distributed across all the storage devices. Typically, "N+1" storage devices in a set, or "redundancy group", are divided into a plurality of equally sized address areas referred to as blocks. Each storage device generally contains the same number of blocks. Blocks from each storage device in a redundancy group having the same unit address ranges are referred to as "stripes". Each stripe has N blocks of data, plus one parity block on one storage device containing parity for the N data blocks of the stripe. Further stripes each have a parity block, the parity blocks being distributed on different storage devices. Parity updating activity associated with every modification of data in a redundancy group is therefore distributed over the different storage devices. No single storage device is burdened with all of the parity update activity, and thus the parity storage device access bottleneck is diffused. For example, in a level 5 RAID system comprising five storage devices, the parity information for the first stripe of blocks may be written to the fifth drive; the parity information for the second stripe may be written to the fourth drive; the parity information for the third strip may be written to the third drive, and so on. The parity block for succeeding stripes typically circles around the storage devices in a helical pattern.

The RAID storage systems described above all handle the problem of providing access to redundant data if one or more storage devices fail. However, early RAID storage systems provided only one storage device array controller. In such a system, if the controller fails, data is inaccessible regardless of the RAID architecture level, so storage of redundant data is rendered moot.

Increasingly, there is a need to provide access to stored information or data on hard disk drives (or other storage devices) from a plurality of host servers and to also permit the data stored on any particular storage device to be accessed through alternative device controllers. Providing access to the data from multiple hosts would eliminate the need to store the data at more than one location (though the data may still be redundantly stored using known mirroring or Redundant Array of Independent Disk (RAID) techniques) and in theory assures that the identical data can be accessed by interested parties. Providing accesses to a storage device through multiple controllers would provide redundant access to the device from an alternate (or second) controller so that the data remains accessible in the event that the first controller fails.

A storage controller is a device which is capable of directing and data traffic from the host system to one or more non-volatile storage devices. It may or may not have an intermediary cache to stage data between the non-volatile storage device and the host system. A caching controller (or caching storage controller) is a device which is capable of directing the data traffic from a host system to one or more non-volatile storage devices which uses an intermediary data storage device (the cache memory) to stage data between the non-volatile storage device and the host system. In general, the intermediary storage device is built out of RAM to allow a quicker access time to the data. Furthermore, it provides a buffer in which to allow exclusive-or (XOR) operations to be completed for RAID 5 operations. Multiple active controllers are defined as a collection of storage controllers or caching storage controllers which work in a cooperative manner with each other. They provide the ability for recovering from a controller failure by allowing multiple paths to a storage volume.

The storage volume is a contiguous range of randomly accessible sector of data. For practical purposes, the sector numbering starts at 0 and goes to N, where N+1 is the total number of sectors available to the host system. A data extent is a range of data within a storage volume delineated by a starting sector and an ending sector. The storage volume is broken up into a number of data extents which are not required to be of the equivalent sizes, but may not overlap. These concepts are used in the discussion of the background and the detailed description of embodiments of the invention, and apply to both.

Caching storage controllers that work independently of one another to store information or data to a secondary storage unit, such as a hard disk drive, or tape unit, are conventionally available. There are also caching storage controllers that work with one or more other controller(s) to provide multiple controller access to a secondary storage unit and provide a fault tolerant environment. If two controllers are simultaneously providing access to a common set of storage devices and each is able to take over the other's functionality in the event of a failure, then those controllers are referred to as active-active or dual-active controllers.

Traditionally, RAID Storage subsystems employ either internal or external controllers. Typical designs of External Dual Active RAID controllers allow the controllers to share one or more buses on the backend or disk side of the controller. However, the cache coherency processing on each primary controller is too high and the throughput is too low.

It can be seen then that there is a need for a controller and controller system for reducing the overhead of cache coherency processing on each primary controller and increasing the overall throughput of the system.

SUMMARY OF THE INVENTION

To overcome the limitations in the prior art described above, and to overcome other limitations that will become apparent upon reading and understanding the present specification, the present invention discloses an apparatus for reducing the overhead of cache coherency processing on each primary controller and increasing the overall throughput of the system.

The present invention solves the above-described problems by employing a traditional dual-active pair of external controllers with a third intermediate controller disposed between the backend disk drive buses. The third controller allows a doubling of the number of backend busses, reduces the overhead of cache coherency processing on each primary controller by ½, and doubles the overall throughput.

A bridged storage controller in accordance with the principles of the present invention includes a control unit having 2N ports coupled to 2N disk channels, the 2N disk channels being shared by the bridged storage controller and N host-side controllers to increase system performance.

In another embodiment of the present invention, a storage system is provided. The storage system includes a plurality of hosts, a storage system, N host-side controllers disposed between the plurality of hosts and the storage system and a bridged controller disposed between the N host-side controllers and the storage system, the bridged controller comprising a control unit having 2N ports coupled to 2N disk channels, the 2N disk channels being shared by the bridged storage controller and N host-side controllers to increase system performance.

In another embodiment of the present invention, another embodiment of a storage system is provided that includes control means having 2N ports coupled to 2N disk channel means, the 2N disk channel means being shared by the bridged storage controller and N host-side controller means for increasing system performance.

In another embodiment of the present invention, another embodiment of a storage system is provided that includes a plurality of hosts, storage means for storing system data, N host-side controller means disposed between the plurality of hosts and the storage system for providing access by the plurality of host to data on the storage means and bridged controller means disposed between the N host-side controller means and the storage means for increasing the performance of the storage system, the bridged controller means comprising a control unit having 2N ports coupled to 2N disk channel means, the 2N disk channel means being shared by the bridged storage controller and N host-side controllers for increasing system performance.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an apparatus for reducing the overhead of cache coherency processing on each primary controller and increasing the overall throughput of the system. A traditional dual-active pair of external controllers is provided with a third RAID controller disposed between the backend disk drive buses. The third controller allows a doubling of the number of backend busses, reduces the overhead of cache coherency processing on each primary controller by ½, and doubled the overall throughput.

Figure 1:
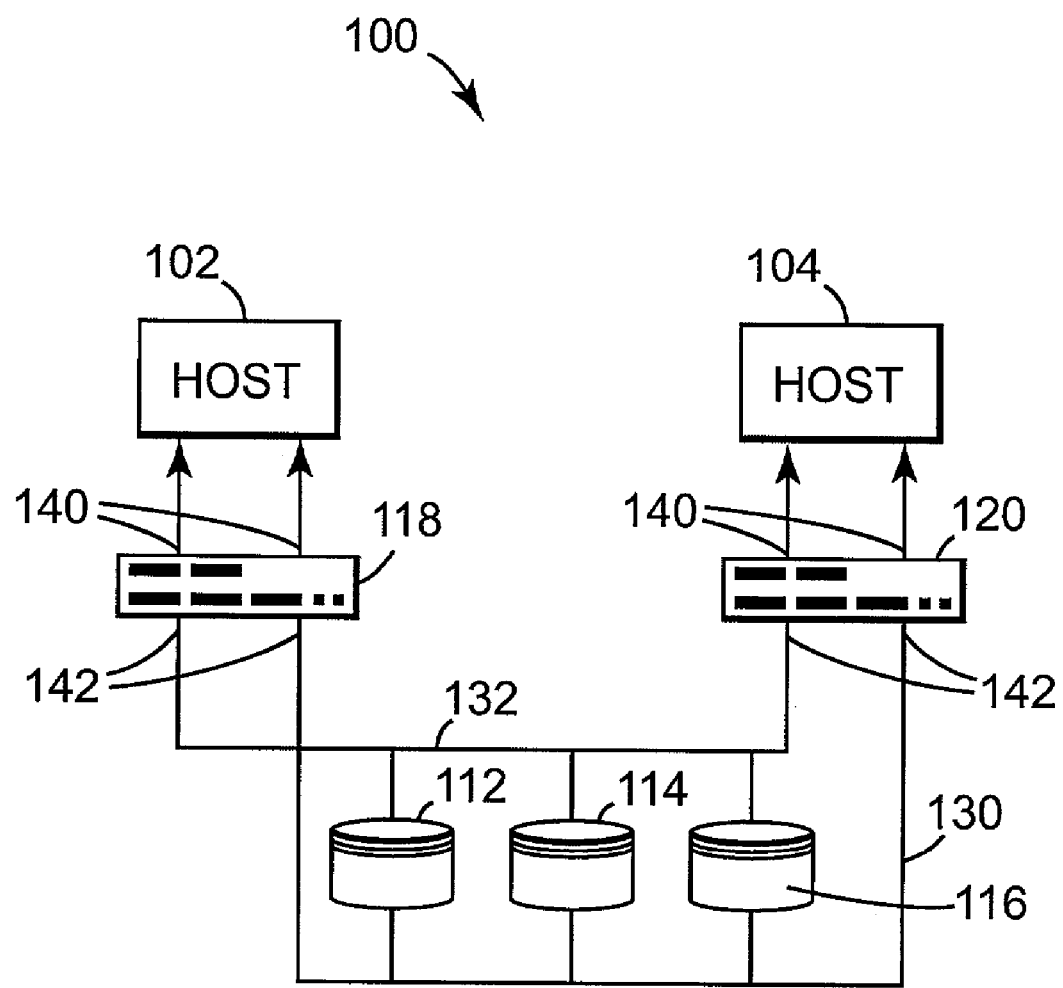
FIG. 1 illustrates a typical computer storage system.

FIG. 1 illustrates a typical computer storage system 100. In FIG. 1, the computer storage system 100 includes a host computers 102, 104 a plurality of storage devices 112, 114, 116, first and second storage controllers 118, 120 coupled between the host computers 102, 104 and the storage devices 112, 114, 116. In FIG. 1 only three storage devices are shown. However, the present invention is not meant to be limited to any particular number or type of storage devices.

The host computers 102, 104, plurality of storage devices 112, 114, 116, and first and second storage controllers 118, 120 are coupled by interfaces and communications links 130, 132, such as for example, busses or network connections.

As shown in FIG. 1, the external dual active storage controllers 118, 120 share one or more buses 130, 132 on the backend or storage device side of the controller. FIG. 1 shows two backend buses 130, 132. However, the present invention is not meant to be limited to any configuration where the number of host connections and disk connections on a controller are the same.

Figure 2:
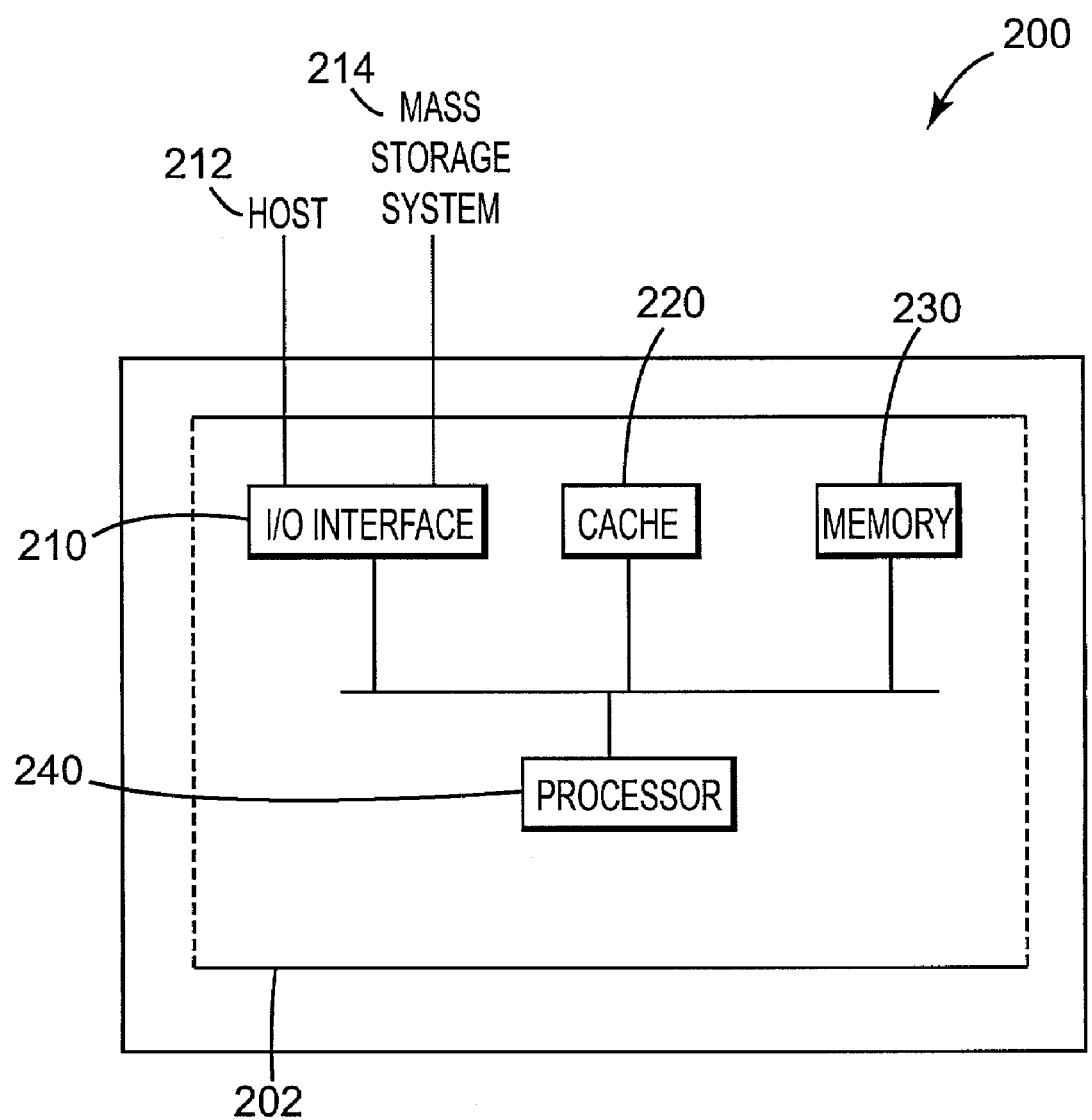
FIG. 2 illustrates a storage controller according to an embodiment of the present invention.

FIG. 2 illustrates a storage controller 200 according to an embodiment of the present invention. The storage controller 200 including at least one input/output interface 210 for permitting communication with a host computer 212 and a mass storage system 214. The connection to the host computer 212 and to the mass storage system 214 are shown as a single connections. However, the input/output may provide any number of connections to the host computer 212 and to the mass storage system 214.

The storage controller 200 also includes a control unit 202 that may include cache 220 having a number of cache lines, some of which cache lines may include dirty data, a memory 230 for maintaining a stripe lock and a processor 240 that is coupled to the memory and cache. The processor 240 associates dirty cache lines with a stripe lock maintained within the memory 230, wherein the stripe lock represents cache lines within data extents of a system storage device associated with the dirty cache lines. The processor 240 further maintains the stripe locks on a linked list for the system storage device in the memory 230, sets stripe locks for the system storage device to be quiesced to a clearing state and flushes cache lines set for clearing that are associated with the system storage device to be quiesced.

The processor 240 determines monitors the cache 220 and maintains coherency for the cache 220. The memory 230 may include stripe lock records. Alternatively, stripe lock records may be maintain in storage separate from the storage controller, such in the mass storage system 214. The memory 230 may further include a storage volume ownership transaction data structure for tracking transactions with other storage controllers. The memory 230 may further includes a lock request data structure as described above for establishing a lock on a storage volume.

Figure 3:
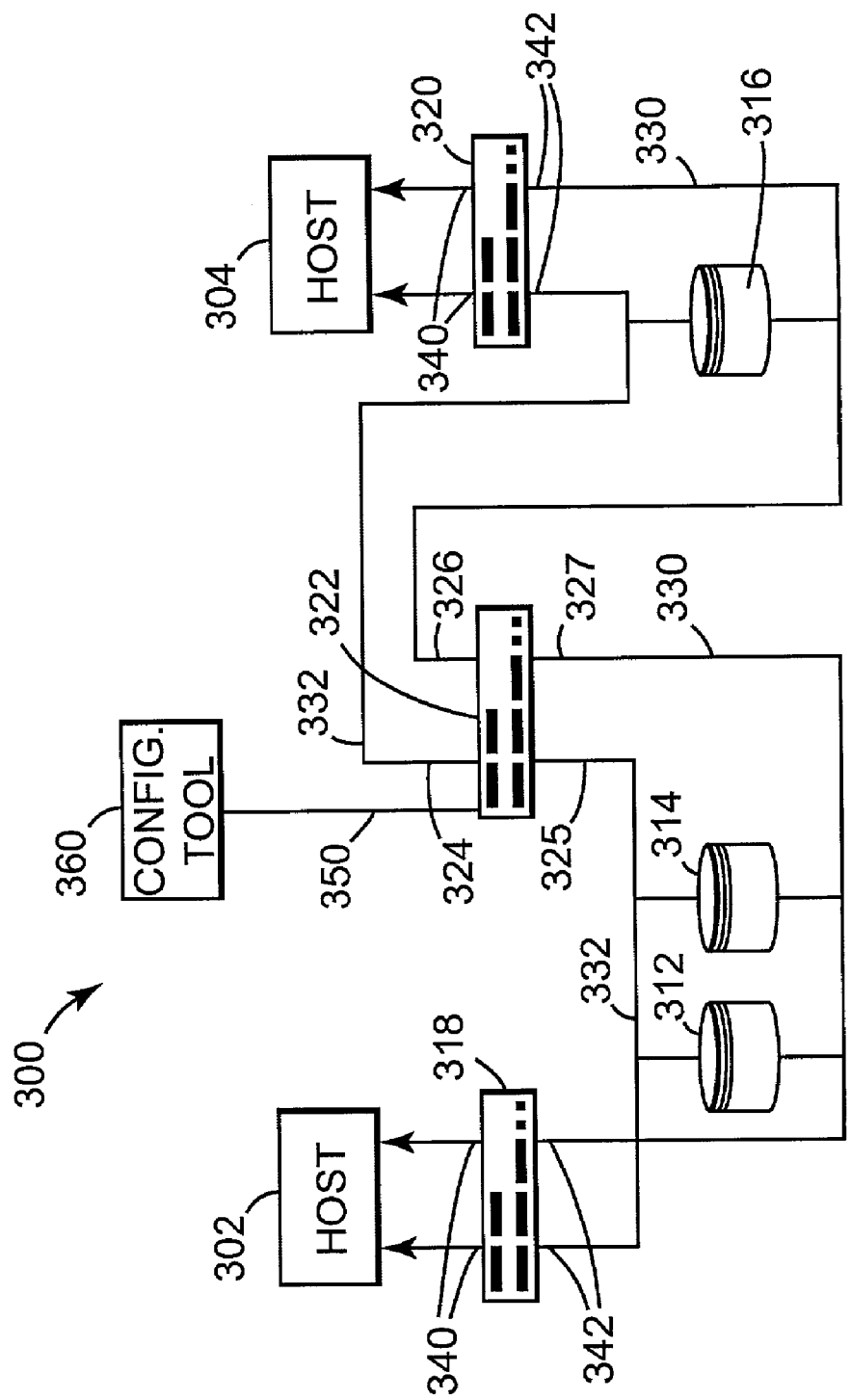
FIG. 3 illustrates a computer storage system according to the present invention.

FIG. 3 illustrates a computer storage system 300 according to the present invention. In FIG. 3, the computer storage system 300 includes a host computers 302, 304 a plurality of storage devices 312, 314, 316, first and second storage controllers 318, 320 coupled between the host computers 302, 304 and the storage devices 312, 314, 316. A third storage controller 322 is disposed between the storage controllers 318, 320. The third controller 322 allows a doubling of the number of backend busses, reduces the overhead of cache coherency processing on each primary controllers 318, 320 by 50%, and doubles the overall throughput.

The third controller 322 includes four disk channels 324–327 that are shared between the host-side controllers 318, 320, i.e., controller 322 shares two disk channels 325, 327 with host-side controller 318 and two disk channels 324, 326 with host-side controller 320. Host-side controllers 318, 320 each include two host channels 340 and two disk channels 342. An Ethernet connection 350 may be provided to the third controller 322 to allow a configuration tool 360 to monitor and report status to a server without any impact to performance.

Figure 4:
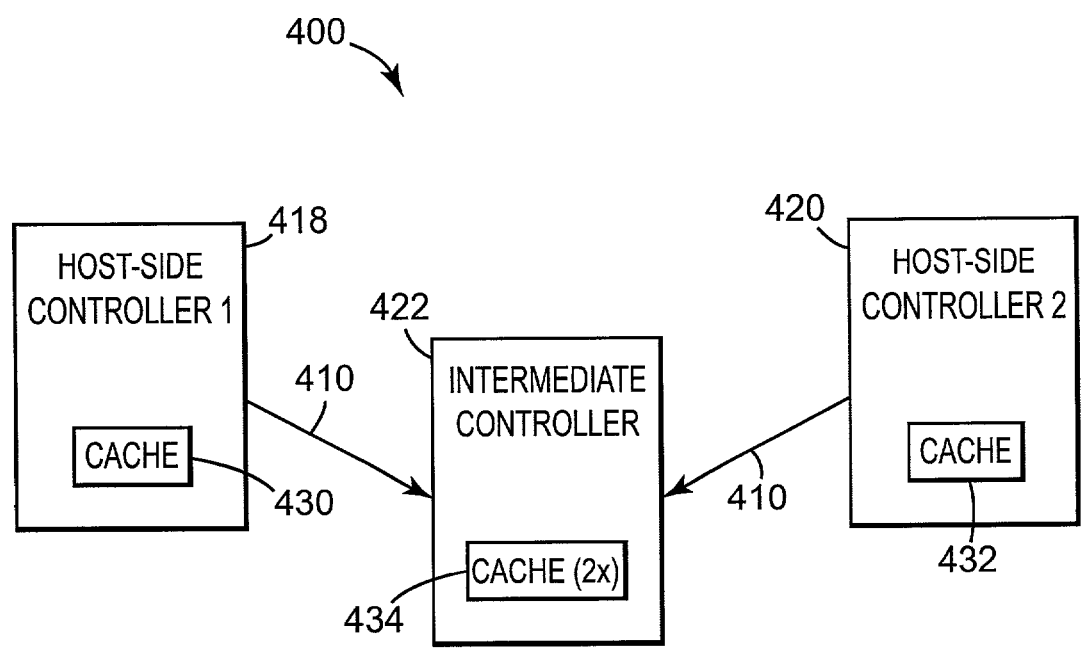
FIG. 4 illustrates a block diagram of a computer system showing messaging between two host-side controllers and a third intermediate controller according to the present invention.

FIG. 4 illustrates a block diagram of a computer system 400 showing messaging 410 between two host-side controllers 418, 420 and a third intermediate controller 422 according to the present invention. Each of the host-side controllers 418, 420 include cache 430, 432. When two or more processors, e.g., as implemented in the two host-side controllers 418, 420, are updating the same storage location, the content of the location may not be the same when viewed from the different host-side controllers 418, 420. This is due to the fact that one or both host-side controllers 418, 420 may have a separate copy of the information in a cache 430, 432, respectively. The location is said to be non-coherent. Coherency is when the storage subsystem manages multiple copies of storage locations in main memory or in caches to guarantee that a particular processor sees its correct value. As illustrated in FIG. 4, the host-side controllers 418, 420 only write a copy of their cache to the cache 434 of the third controller 422. The cache 434 of the intermediate controller must equal the capacity of the cache 430, 432 of the host-side controllers 418, 420 and is typically twice the capacity of the cache 430, 432 on the host-side controllers 418, 420. The host-side controllers 418, 420 do not need to process writes from the other controller. This reduces the cache coherency processing overhead for the two host-side controllers 418, 420, thereby allowing the resources of the host-side controller 418, 420 to be used more effectively and to increase system throughput.

Figure 5:
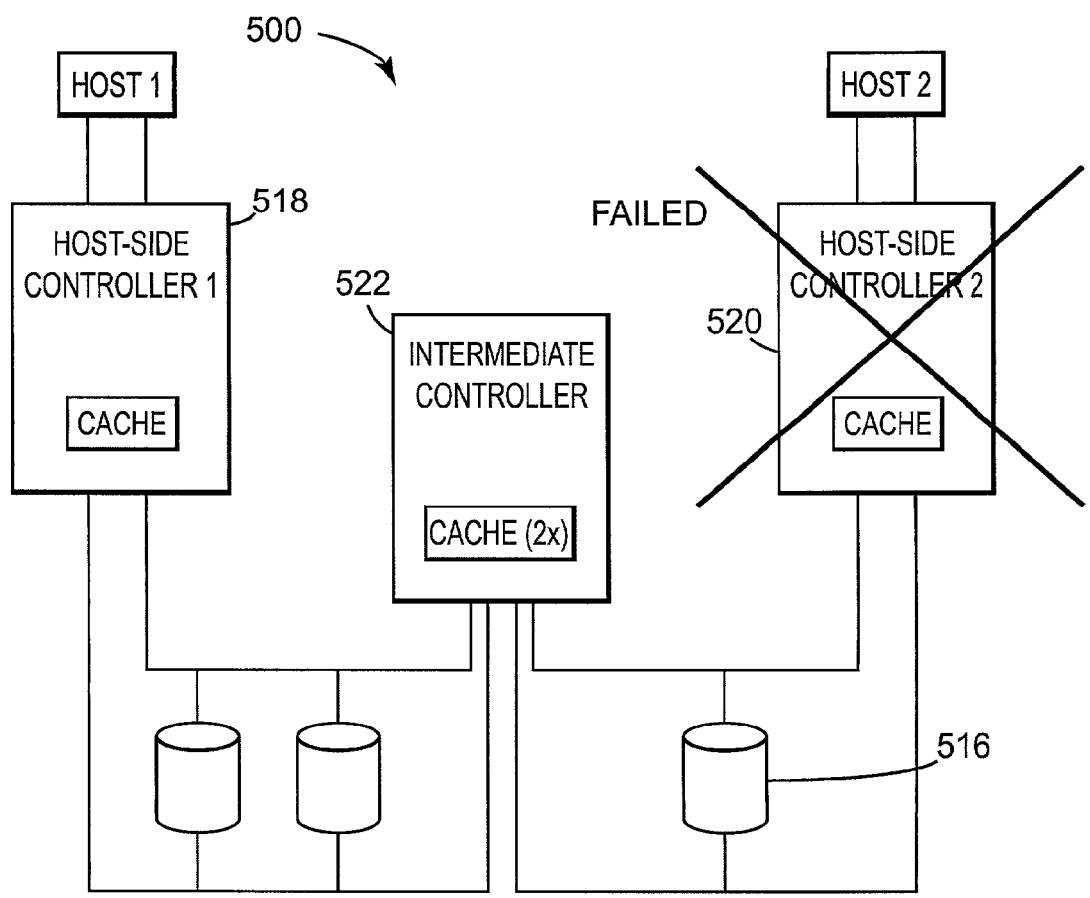
FIG. 5 illustrates a block diagram of a computer system showing recovery from a failure of one of the host-side controllers according to the present invention.

FIG. 5 illustrates a block diagram of a computer system 500 showing recovery from a failure of one of the host-side controllers according to the present invention. In FIG. 5, the second host-side controller 520 fails. Normally, this would mean that access to the storage devices 516 on the failed side could not be achieved. However, through the intermediate controller 522 according to the present invention, in the event of a failure of a host-side controller 518, 520, access to the disks on the "failed" side can be gained through the third controller 522. This greatly increases the reliability of the computer system 500.

Figure 6:
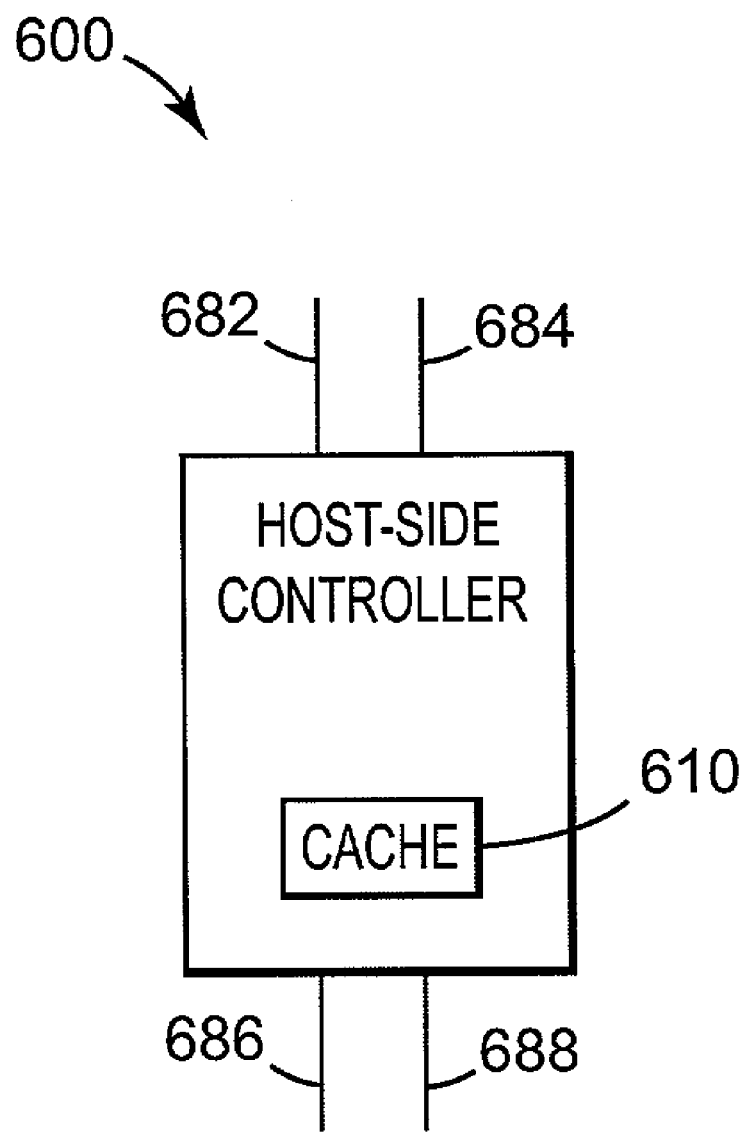
FIG. 6 illustrates one of the host-side controllers according to the present invention.

FIG. 6 illustrates one of the host-side controllers 600 according to the present invention. In FIG. 6, the host-side controller 600 includes cache 610 as well as two host side ports 682, 684 and two disk side ports 686, 688. The bandwidth of each host-side controller 600 is balanced using the third controller (see FIG. 3 for example). Throughput is doubled, but balanced because each host-side controller 600 includes at least two host side ports 682, 684 and two disk ports 686, 688 processing data requests and writes. Therefore, processing of a second request is not delayed by one port using all of the throughput in processing the first request.

Figure 7:
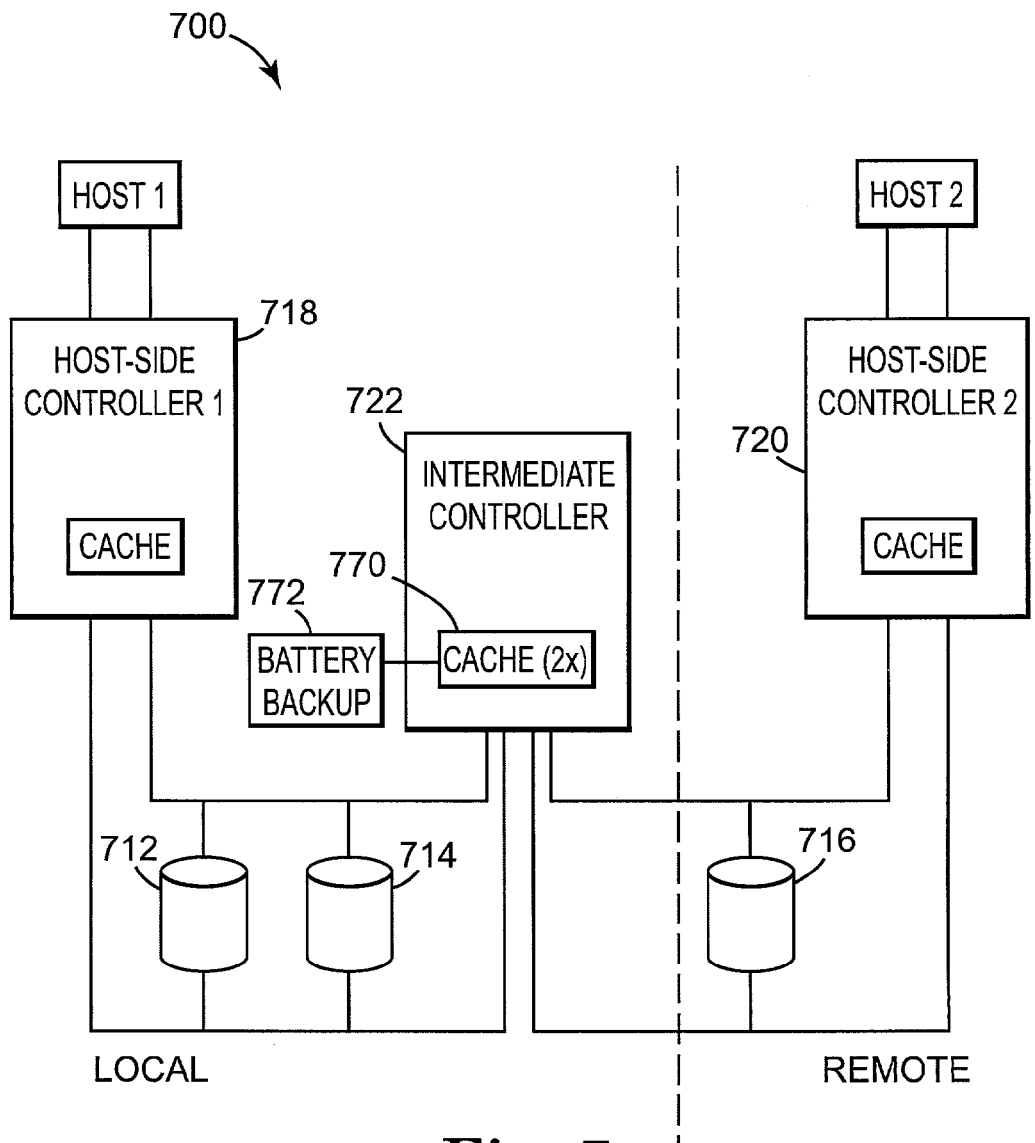
FIG. 7 illustrates a system block diagram wherein two host-side controllers are located geographically apart.

FIG. 7 illustrates a system block diagram 700 wherein two host-side controllers 718, 720 are located geographically apart according to the present invention. FIG. 7 illustrates that remote mirroring may be supported when the two host-side controllers 718, 720 are located geographically apart. A mirrored drive 716 in effect creates a redundant data drive for each data drive 712, 714. A write to a disk array utilizing the mirrored drive fault tolerance technique will result in a write to primary data disks 712, 714 and a write to mirror drive 716. This technique results in a minimum loss of performance in the disk array. However, those skilled in the art will recognize that the present invention is not meant to be limited to the particular configuration, and that other configurations are possible in accordance with the teaching of the present invention.

In addition, an advantage of the storage system 700 according to the present invention is that only the third intermediate controller 722 needs to have cache 770 backed by battery 772. Because the third intermediate controller 722 maintains the cache coherency, only the third intermediate controller 722 requires cache 770 backed by battery 772. If the cache of one of the two host-side controllers 718, 720 fails, it can be recreated from the cache 770 of the third intermediate controller 722.

Figure 8:
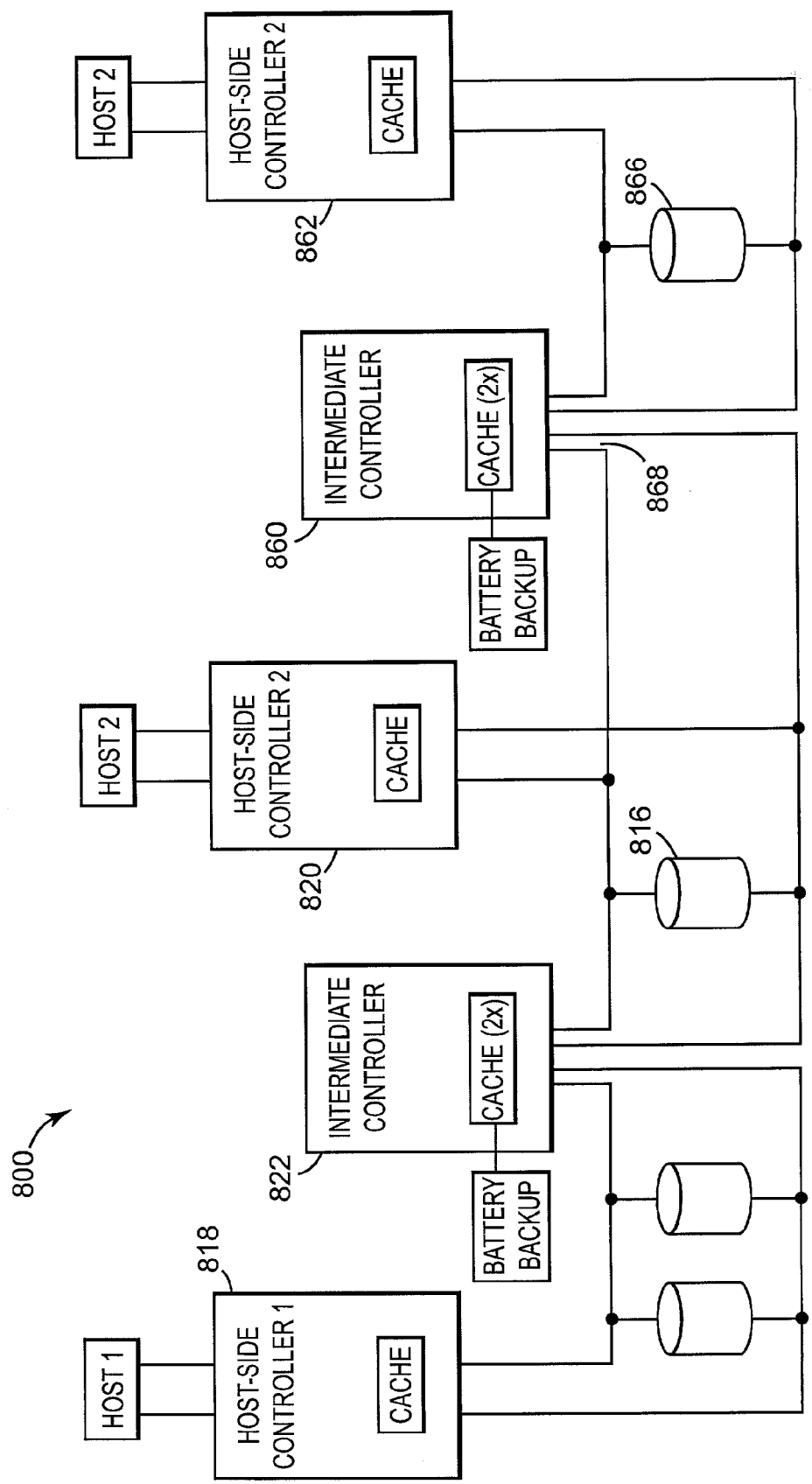
FIG. 8 illustrates extension of the computer system 800 according to the present invention.

FIG. 8 illustrates extension of the computer system 800 according to the present invention. For example, in a SAN environment, the storage system 800 according to the present invention is extendable by adding another (second) intermediate controller 860 and another host controller 862. The second intermediate controller 860 is coupled between the storage devices 816, 866. A third host controller 862 is coupled to the second intermediate controller 860. The second intermediate controller 860 includes four disk channels 868 that are shared between the second 820 and third 862 host-side controllers. This technique is extensible so that the present invention is not meat to be limited to two intermediate controllers 822, 860 and three host-side controllers 818, 820, 862. Other configurations in accordance with the present invention are possible.

Figure 9:
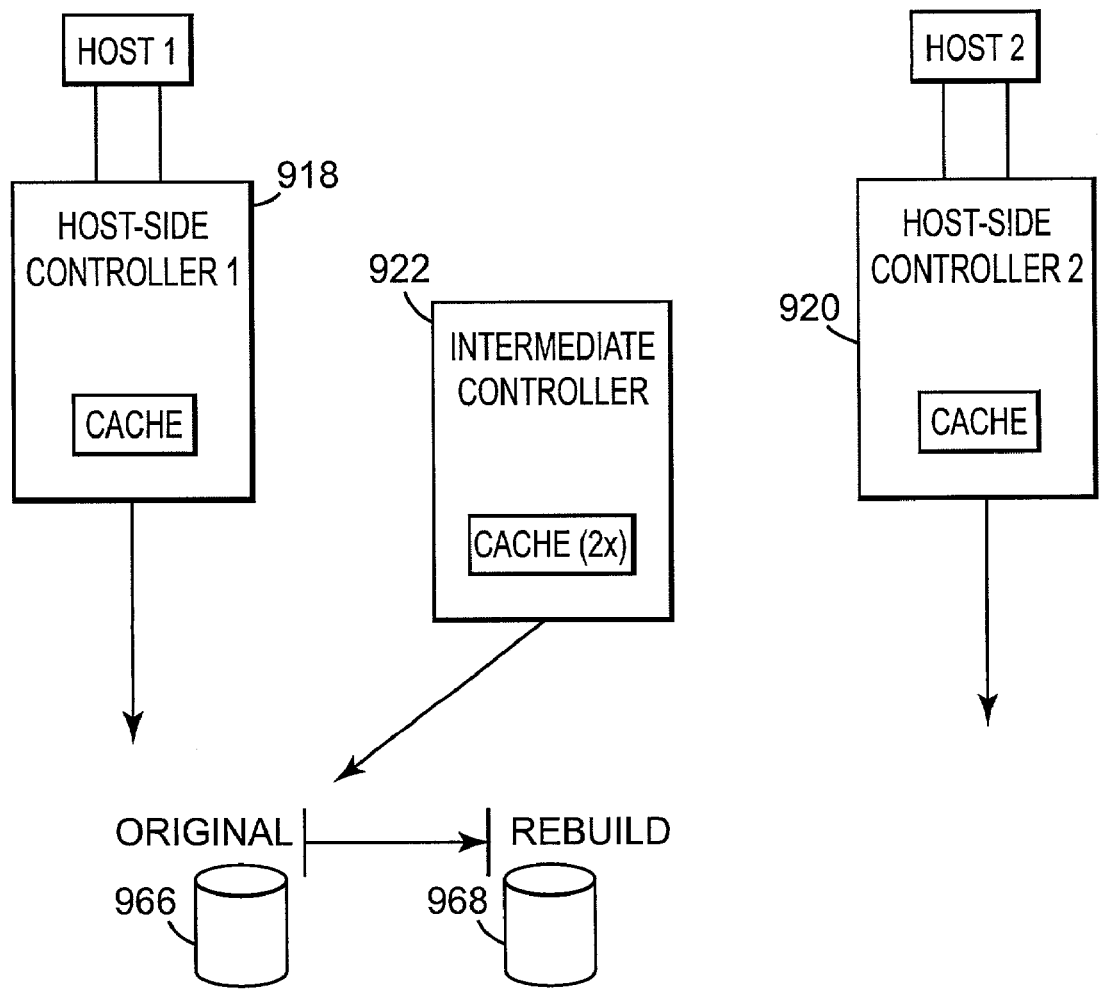
FIG. 9 illustrates a block diagram of a computer system showing a rebuild operation according to the present invention.

FIG. 9 illustrates a block diagram of a computer system 900 showing a rebuild operation according to the present invention. A storage system will experience degraded operation after a drive failure. Moreover, data removed from the array with the departure of a disk must be regenerated on a new disk. This process is called rebuilding. A mirrored array must copy the contents of the good drive 966 over to the replacement drive 968. A striped array with parity must have the entire contents of the replacement drive 968 replaced by determining new parity information and/or replacement data calculated from parity information for all the data on the good drives. Clearly, these procedures are going to be time-consuming and also relatively slow. For example, they can take several hours. During this time, the array will function properly, but its performance will be greatly diminished. The impact on performance of rebuilding depends entirely on the RAID level and the nature of the controller, but it usually affects it significantly. However, according to the present invention, the intermediate controller 922 can perform disk rebuild operations rather than two host-side controllers 918, 920. The off-loading of the rebuild process from the host-side controllers 918, 920 by the intermediate controller 922 reduces the performance impact on the host-side controllers 918, 920.

Figure 10:
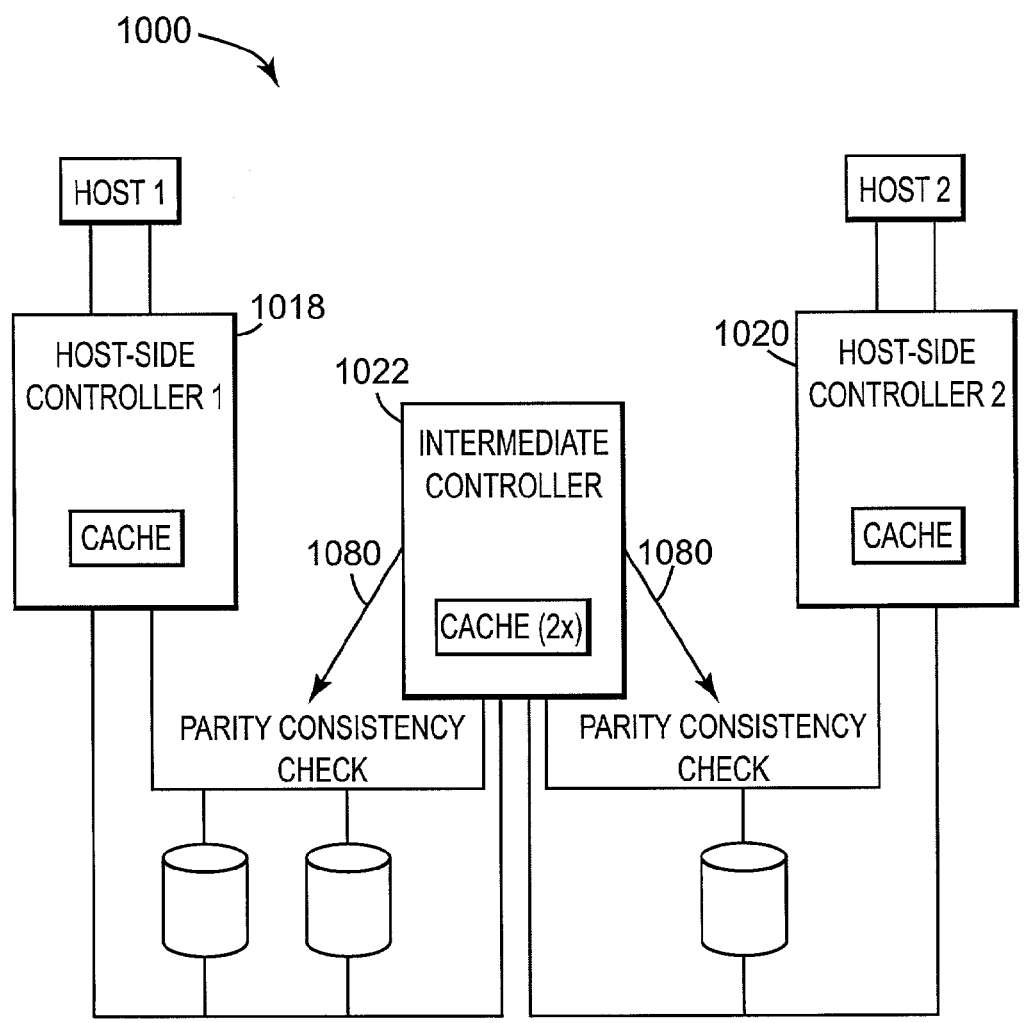
FIG. 10 illustrates a block diagram of a computer system showing parity checking according to the present invention.

FIG. 10 illustrates a block diagram of a computer system 1000 showing parity checking according to the present invention. For example, RAID systems provide high reliability and data availability through a technique called parity checking. In this scheme, when a controller 1018, 1020 writes information onto the disks, it also writes redundant information called parity bits. Should a disk fail, this parity information enables a controller to recompute the lost information as it is requested without degrading performance. Advanced controllers will reconstruct the lost data onto a spare disk, so that the system can survive another disk failure. In FIG. 10, the intermediate controller 1022 can perform parity consistency checks 1080 to any of the storage device 1012, 1014, 1016 thereby further off-loading the process from the host-side controllers 1018, 1020. This also reduces the performance impact on the host-side controllers 1018, 1020.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A bridged storage controller, comprising a control unit having 2N ports coupled to 2N disk channels, the 2N disk channels being shared by the bridged storage controller and N host-side controllers to increase system performance, wherein the increase in system performance comprises a reduction in an overhead of cache coherency processing on the N host-side controllers and increases an overall throughput for the system.

2. The bridged storage controller of claim 1 wherein the N host-side controllers only write a copy of their cache to the bridged controller.

3. The bridged storage controller of claim 1 wherein the 2N disk channels enable the host to access storage devices on a failed side through the bridged controller in the event of a failure of a host-side controller.

4. The bridged storage controller of claim 1 wherein the 2N disk channels allow the bridged storage controller to balance the bandwidth of the host-side controllers.

5. The bridged storage controller of claim 1 wherein the 2N disk channels enable the bridged storage controller to perform disk rebuild operations thereby off-loading the process from the host-side controllers thereby reducing the performance impact of the disk rebuild operations.

6. The bridged storage controller of claim 1 wherein the 2N disk channels enable the bridged controller to perform parity consistency checks thereby off-loading the process from the host-side controllers and reducing the performance impact of the parity consistency checks.

7. The bridged storage controller of claim 1 further comprising an Ethernet connection allowing a configuration tool to monitor and report status regarding the bridged controller to a server without any impact to performance.

8. A storage system, comprising:
a plurality of hosts;
a plurality of storage systems;
N host-side controllers disposed between the plurality of hosts and the plurality of storage systems; and
a bridged controller disposed between the N host-side controllers and the storage system, the bridged controller comprising a control unit having 2N ports coupled to 2N disk channels, the 2N disk channels being shared by the bridged storage controller and N host-side controllers to increase system performance, wherein the increase in system performance comprises a reduction in an overhead of cache coherency processing on the N host-side controllers and increases an overall throughput for the storage system.

9. The storage system of claim 8 wherein the N host-side controllers only write a copy of their cache to the bridged controller.

10. The storage system of claim 8 wherein the host and 2N disk channels enable access to storage devices on a failed side in the event of a failure of a host-side controller.

11. The storage system of claim 8 wherein the host and 2N disk channels allow the bridged storage controller to balance the bandwidth of the N host-side controllers.

12. The storage system of claim 8 wherein the host and 2N disk channels enable the bridged storage controller to perform disk rebuild operations thereby off-loading the process from the N host-side controllers thereby reducing the performance impact of the disk rebuild operations.

13. The storage system of claim 8 wherein the host and 2N disk channels enable the bridged controller to perform parity consistency checks thereby off-loading the process from the N host-side controllers and reducing the performance impact of the parity consistency checks.

14. The storage system of claim 8 further comprising an Ethernet connection to the bridged storage controller, the Ethernet connection allowing a configuration tool to monitor and report status regarding the bridged controller to a server without any impact to performance.

15. A bridged storage controller, comprising a control unit having 2N ports coupled to 2N disk channels, the 2N disk channels being shared by the bridged storage controller and N host-side controllers to increase system performance, wherein the N host-side controllers only write a copy of their cache to the bridged controller.

16. A storage system, comprising:
a plurality of hosts;
a plurality of storage systems;
N host-side controllers disposed between the plurality of hosts and the plurality of storage systems; and
a bridged controller disposed between the N host-side controllers and the storage system, the bridged controller comprising a control unit having 2N ports coupled to 2N disk channels, the 2N disk channels being shared by the bridged storage controller and N host-side controllers to increase system performance, wherein the N host-side controllers only write a copy of their cache to the bridged controller.

* * * * *